US009793548B2

(12) United States Patent
Freydina

(10) Patent No.: US 9,793,548 B2
(45) Date of Patent: Oct. 17, 2017

(54) METHOD OF DEPOSITING NANOSCALE MATERIALS WITHIN A NANOFIBER NETWORK AND NETWORKED NANOFIBERS WITH COATING

(71) Applicant: WELLSTAT BIOCATALYSIS, LLC, Rockville, MD (US)

(72) Inventor: Evgeniya Freydina, Acton, MA (US)

(73) Assignee: WELLSTAT BIOCATALYSIS, LLC, Rockville, MD (US)

( * ) Notice: Subject to any disclaimer, the term of this patent is extended or adjusted under 35 U.S.C. 154(b) by 0 days.

(21) Appl. No.: 14/774,752

(22) PCT Filed: Mar. 12, 2014

(86) PCT No.: PCT/US2014/024458
§ 371 (c)(1),
(2) Date: Sep. 11, 2015

(87) PCT Pub. No.: WO2014/150885
PCT Pub. Date: Sep. 25, 2014

(65) Prior Publication Data
US 2016/0036058 A1    Feb. 4, 2016

Related U.S. Application Data

(60) Provisional application No. 61/786,776, filed on Mar. 15, 2013.

(51) Int. Cl.
*H01M 4/66* (2006.01)
*H01M 4/48* (2010.01)
(Continued)

(52) U.S. Cl.
CPC ............. *H01M 4/663* (2013.01); *C04B 35/52* (2013.01); *C04B 35/62844* (2013.01);
(Continued)

(58) Field of Classification Search
None
See application file for complete search history.

(56) References Cited

U.S. PATENT DOCUMENTS 8,246,860 B2 *   8/2012   Liu ........................ H01B 1/04
252/502
2008/0176740 A1   7/2008   Ma
(Continued)

OTHER PUBLICATIONS

European Patent Office, Supplementary Partial European Search Report, Oct. 13, 2016.

*Primary Examiner* — Patrick Ryan
*Assistant Examiner* — Christopher Domone
(74) *Attorney, Agent, or Firm* — Laura L. Lee; Lewis Kreisler

(57) ABSTRACT

Provided herein is a method of manufacturing a nanoscale coated network, which includes providing nanofibers, capable of forming a network in the presence of a liquid vehicle and providing a nanoscale solid substance in the presence of the liquid vehicle. The method may also include forming a network of the nanofibers and the nanoscale solid substance and redistributing at least a portion of the nanoscale solid substance within the network to produce a network of nanofibers coated with the nanoscale solid substance. Also provided herein is a nanoscale coated network with an active material coating that is redistributed to cover and electrochemically isolate the network from materials outside the network.

16 Claims, 11 Drawing Sheets

(51) Int. Cl.
*H01M 4/04* (2006.01)
*C04B 35/52* (2006.01)
*C04B 35/628* (2006.01)
*H01M 4/02* (2006.01)
*H01M 4/62* (2006.01)

(52) U.S. Cl.
CPC .. *C04B 35/62847* (2013.01); *C04B 35/62852* (2013.01); *C04B 35/62881* (2013.01); *C04B 35/62886* (2013.01); *H01M 4/02* (2013.01); *H01M 4/0402* (2013.01); *H01M 4/0416* (2013.01); *H01M 4/48* (2013.01); *H01M 4/625* (2013.01); *C04B 2235/3206* (2013.01); *C04B 2235/3217* (2013.01); *C04B 2235/3262* (2013.01); *C04B 2235/3272* (2013.01); *C04B 2235/3275* (2013.01); *C04B 2235/3279* (2013.01); *C04B 2235/3284* (2013.01); *C04B 2235/3291* (2013.01); *C04B 2235/3296* (2013.01); *C04B 2235/44* (2013.01); *C04B 2235/442* (2013.01); *C04B 2235/443* (2013.01); *C04B 2235/445* (2013.01); *C04B 2235/448* (2013.01); *C04B 2235/449* (2013.01); *C04B 2235/5264* (2013.01); *C04B 2235/5268* (2013.01); *C04B 2235/5288* (2013.01)

(56) References Cited

U.S. PATENT DOCUMENTS

| | | |
|---|---|---|
| 2009/0004564 A1 | 1/2009 | Ishida |
| 2009/0305131 A1* | 12/2009 | Kumar .................. B22F 3/1146 429/206 |
| 2010/0178543 A1* | 7/2010 | Gruner .................. B82Y 30/00 429/121 |
| 2012/0107582 A1 | 5/2012 | Metz |
| 2013/0022755 A1 | 1/2013 | D'Arcy |

* cited by examiner

METHOD OF DEPOSITING NANOSCALE MATERIALS WITHIN A NANOFIBER NETWORK AND NETWORKED NANOFIBERS WITH COATING

BACKGROUND

With the ever increasing use of batteries, consumers desire better performance in terms of speed of charging and discharging, as well as charge capacity from their batteries.

Carbon nanotubes (and other nanosized objects) are becoming more popular in manufacturing as supply increases. However, methods for coating carbon nanotubes have been limited to traditional coating techniques, which lead to non-uniform coating characteristics, especially when the carbon nanotubes are networked prior to coating.

SUMMARY

Due to the size of porous regions within nanofiber networks, deposition of materials within these porous regions has been difficult post-networking of the nanofibers. A method of depositing nanoscale materials within a nanofiber network and networked nanofibers with coating are described herein.

Also provided herein is a method of manufacturing a nanoscale coated network, which includes providing nanofibers, capable of forming a network in the presence of a liquid vehicle; providing a nanoscale solid substance in the presence of the liquid vehicle; forming a network of the nanofibers and the nanoscale solid substance; and redistributing at least a portion of the nanoscale solid substance within the network, thereby producing a network of nanofibers coated with the nanoscale solid substance.

Also provided herein is a method of coating a network, which includes providing a network of nanofibers in the presence of a liquid vehicle; providing a nanoscale solid substance on or in the network; and redistributing at least a portion of the nanoscale solid substance within the network.

Also provided herein is a method of manufacturing a nanoscale coated network, which includes providing nanofibers; coating between 10 and 90 wt. % of the nanofibers with a nanoscale substance resulting in a combination of coated nanofibers and non-coated nanofibers; forming a network of nanofibers with a combination of coated nanofibers and the non-coated nanofibers; and redistributing of at least a portion of the nanoscale substance within the network, thereby producing a network of nanofibers coated with the nanoscale substance.

Also provided herein is a method of forming an electrode, which includes providing a first set of conductive nanofibers; providing a second set of conductive nanofibers; coating the first set of conductive nanofibers with an active material to form coated conductive nanofibers, wherein the second set of conductive nanofibers are non-coated conductive nanofibers; forming a network of conductive nanofibers comprising between 10 and 90 wt. % of the coated conductive nanofibers and the remainder of the network comprising the non-coated conductive nanofibers; and redistributing at least a portion of the active material within the network.

Also provided herein is a method of forming a coated network, which includes providing nanofibers; separating between 10 and 90 wt. % of the nanofibers from the remainder of the nanofibers to form a first and a second group of nanofibers, respectively; coating the first group of nanofibers with a first substance; combining the coated first group of nanofibers with the second group of nanofibers to form a network; redistributing the first substance in the network.

Also provided herein is a nanoscale coated network, which includes one or more first carbon nanotubes electrically connected to one or more second carbon nanotubes to form a nanofiber network, wherein at least one of the one or more second carbon nanotubes is in electrical contact with another of the one or more second carbon nanotubes; and an active material coating that covers at least a portion of the one or more first carbon nanotubes and does not cover the one or more second carbon nanotubes to form the nanoscale coated network.

Also provided herein is a nanoscale coated network, which includes one or more first carbon nanotubes electrically connected to one or more second carbon nanotubes to form a nanofiber network, wherein at least one of the one or more second carbon nanotubes is in electrical contact with another of the one or more second carbon nanotubes; and an active material coating, wherein the active material coating was redistributed from the at least a portion of the one or more first carbon nanotubes to at least a portion of the one or more second carbon nanotubes to cover and electrochemically isolate the network from materials outside the network.

Also provided herein is a nanoscale coated network, which includes one or more first carbon nanotubes electrically connected to one or more second carbon nanotubes to form a nanoscale network, wherein at least one of the one or more first carbon nanotubes is in electrical contact with one or more second carbon nanotubes; and an active material coating that covers at least a portion of the one or more first carbon nanotubes and at least a portion of the one or more second carbon nanotubes to form the nanoscale coated network, wherein the active material coating surrounds, but does not electrically disrupt the electrical contact between the one or more second carbon nanotubes.

Also provided herein is an electrically conductive, electrochemically insulated network of nanofibers, which includes one or more first carbon nanofibers electrically connected to one or more second carbon nanofibers to form an electrically conductive network, wherein at least one of the one or more second carbon nanofibers is in electrical contact with another of the one or more second carbon nanofibers; and an active material that provides electrochemical insulation on an outer portion of at least a portion of the one or more first carbon nanofibers and at least a portion of the one or more second carbon nanofibers, wherein the active material comprises at least 50% by weight of the electrically conductive, electrochemically insulated network.

Also provided herein is a coated nanofiber network, which includes one or more first carbon nanotubes; one or more second carbon nanotubes, wherein at least one of the one or more second carbon nanotubes is in electrical contact with another of the one or more second carbon nanotubes to form a carbon nanotube network; and an active material that covers at least a portion of the carbon nanotube network to form the coated carbon nanotube network, wherein the active material coating surrounds, but does not interfere with the electrical contact between the one or more second carbon nanotubes.

Also provided herein is a coated nanofiber network, which includes one or more first carbon nanotubes; one or more second carbon nanotubes, wherein at least one of the one or more second carbon nanotubes is in electrical contact with another of the one or more second carbon nanotubes to form a carbon nanotube network; and a coating comprising nanoscale compounds of Ni, Zn, Cd, Fe, Pb, Mn, Co, Ag, Al, or Mg that covers at least a portion of the carbon nanotube network to form the coated carbon nanotube network, wherein the one or more first carbon nanotubes and the one or more second carbon nanotubes comprise at most 50% by weight of the coated carbon nanotube network, and the coating comprises at least 50% by weight of the coated carbon nanotube network.

Also provided herein is a coated nanofiber network, which includes one or more first carbon nanotubes; one or more second carbon nanotubes, wherein at least one of the one or more second carbon nanotubes is in electrical contact with another of the one or more second carbon nanotubes to form a carbon nanotube network; and a coating comprising nanoscale particles that cover at least a portion of the carbon nanotube network to form the coated carbon nanotube network, wherein the coated carbon nanotube network has a volume of porosity of 50-90 vol. %.

BRIEF DESCRIPTION OF THE DRAWINGS

The accompanying drawings, which are incorporated and constitute a part of this specification, illustrate an embodiment of the invention. In the drawings.

DETAILED DESCRIPTION

The following detailed description refers to the accompanying drawings. The same reference numbers in different drawings may identify the same or similar elements. Also, the following detailed description describes embodiments and is not intended to limit the invention. Instead, the scope of the invention is defined by the appended claims and equivalents.

A. Overview

Provided herein are electrodes that can provide high speed, high capacity, light weight, and safety in batteries. These electrodes can utilize properties of nanofibers and nanoscale active materials, in conjunction with a current collector, to increase the speed and capacity without additional weight and/or additional safety concerns.

Figure 1:
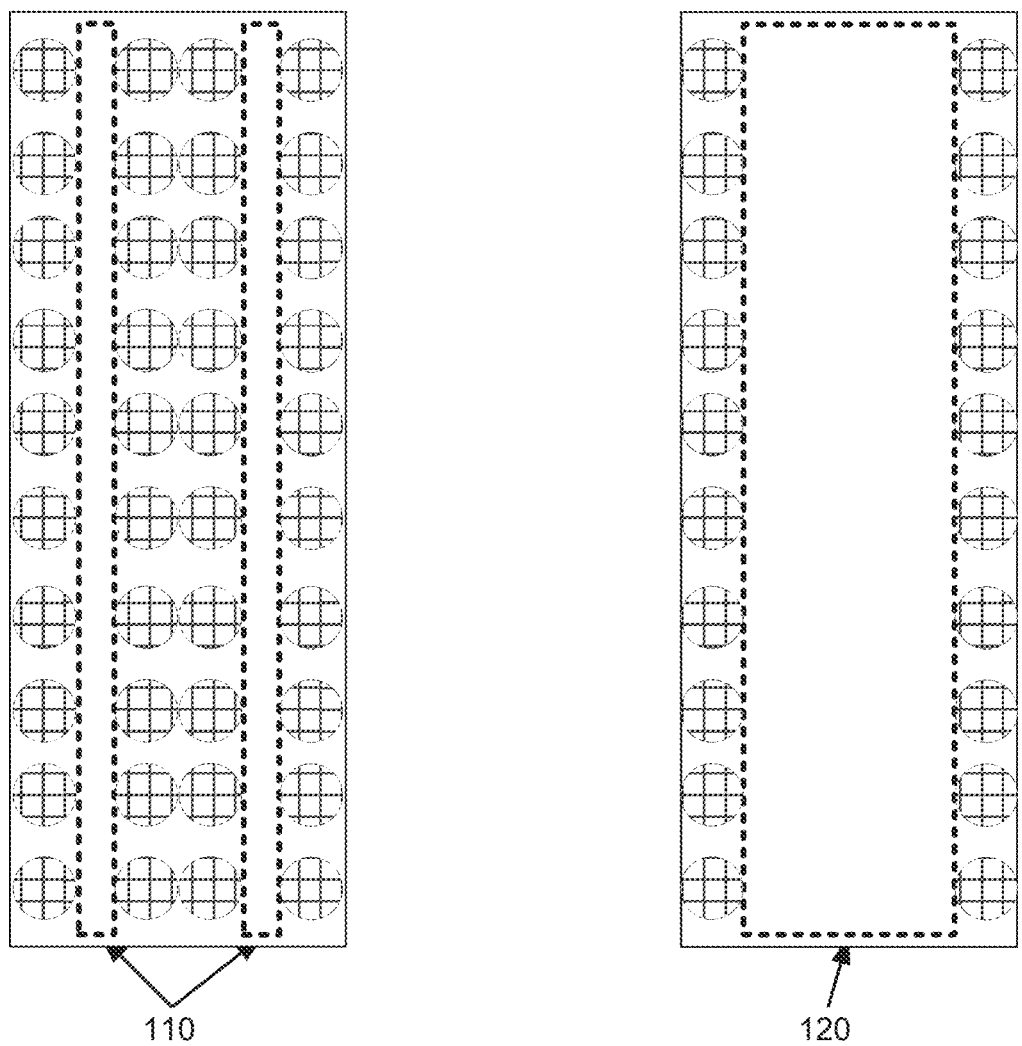
FIG. 1 is an overview illustration of a bulk volume with nanofibers and thick fibers used as support for an active material.

FIG. 1 depicts a bulk volume with nanofibers 110 and thicker fibers 120 used as supports for an active material. As illustrated, thin layers of active material on nanofibers 110 provide more capacity than thin layers of active material on thicker fibers 120 in the same bulk volume.

Increasing the energy density of the active material can also be accomplished by distributing the active material throughout the conductive support network. In one implementation, increasing the energy density of active material can be done by coating a conductive support system with active material. For example, as illustrated in FIG. 2, a fast fibril electrode can be provided in one embodiment by example method 200.

B. Method of Making an Electrode

Figure 2:
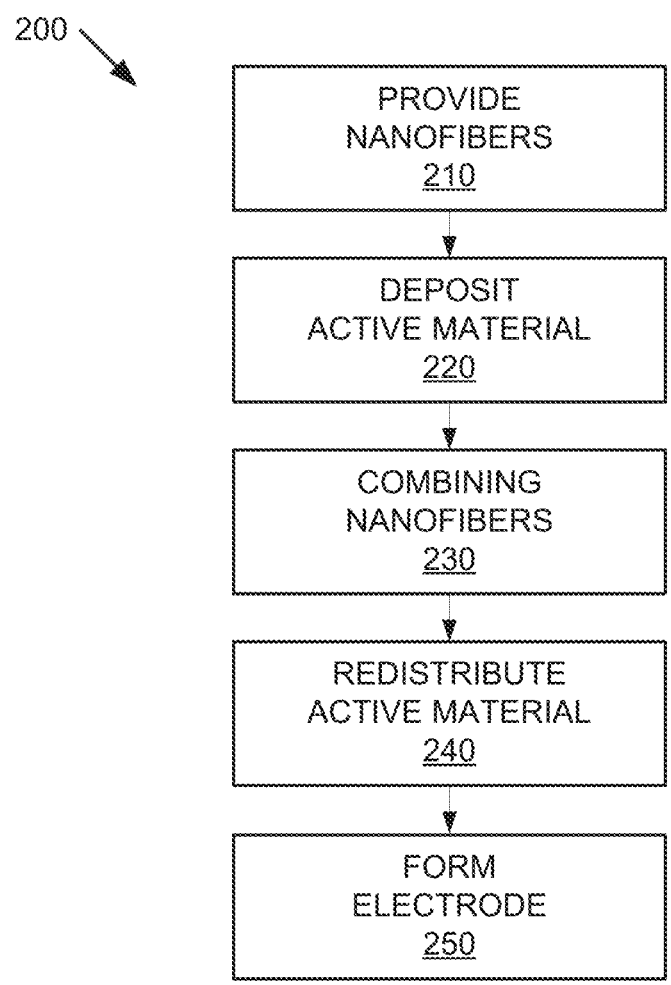
FIG. 2 is an overview illustration of a method by which an electrode may be formed.

FIG. 2 illustrates an example method 200 by which an electrode may be formed. FIGS. 3A-3F are example illustrations for forming an electrode by method 200 of FIG. 2. FIG. 3G is an example illustration for forming a battery using the electrode from method 200 of FIG. 2.

Method 200 can include providing nanofibers in step 210. In one implementation, the nanofibers can be provided in a liquid medium or in another media, such as air.

Figure 3A:
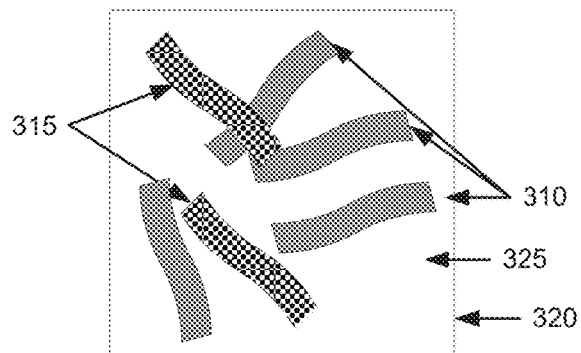
FIGS. 3A-3F are example illustrations for forming an electrode by the method of FIG. 2.

For example, as illustrated in FIG. 3A, first nanofibers 310 and second nanofibers 315 can be provided in a first vessel 320. Nanofibers 310, 315 may be the same or different sized (i.e., diameter, length/diameter ratio, agglomeration size, etc.) nanofibers and may be formed of the same or different types of materials within nanofibers 310 and nanofibers 315, respectively, or between nanofibers 310 and nanofibers 315. For example, nanofibers 310 and nanofibers 315 may be single wall or multi-wall nanotubes, and may further include additional microfibers and/or macrofibers. In one embodiment, one or more nanofibers in nanofibers 315 may include the same or different nanofibers (and microfibers and/or macrofibers) compared to one or more nanofibers in nanofibers 310 or compared to one or more nanofibers in other nanofibers 315.

Additionally, nanofibers 310, 315 may be produced in the same or different batches, which may also yield variations in size, shape, or structure. In one embodiment, nanofibers 310 and nanofibers 315 are similar within each group of nanofibers 310 and nanofibers 315, respectively. In one embodiment, nanofibers 310 and nanofibers 315 may be similar in size and shape throughout nanofibers 310 and nanofibers 315. The various shapes, sizes, and structures for nanofibers 310, 315 are further discussed below.

Nanofibers 310, 315 may be provided in liquid medium 325 that can allow nanofibers 310, 315 to self-assemble (i.e., aggregate or agglomerate) or remain independent (i.e., maintain a certain spacing distance) from other nanofibers 310, 315. In one embodiment, liquid medium 325 can include a liquid vehicle, such as an aqueous solution or an electrolyte. For example, liquid medium 325 may be water. Further discussion on networking of nanofibers may be found in U.S. Pat. No. 6,099,965, U.S. Pat. No. 7,923,403, and U.S. Patent Application Publication No. 2008/0176052 A1, which are incorporated herein in their entireties.

Figure 4:
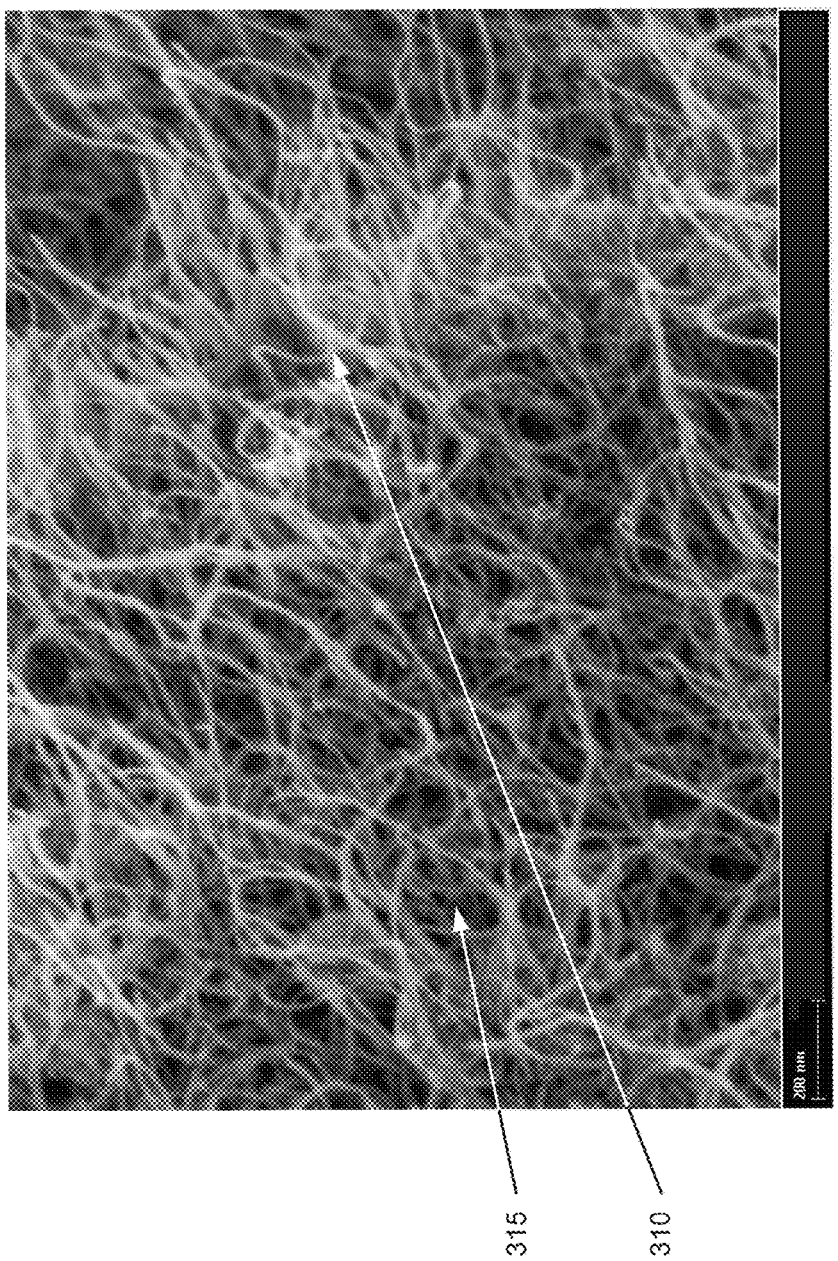
FIG. 4 is a Scanning Electron Microscope (SEM) image of a network of nanofibers.

FIG. 4 is a Scanning Electron Microscope (SEM) image of a network of nanofibers. As illustrated in FIG. 4, nanofibers 310, 315 may be networked or entangled to form one or more aggregations. Further discussion of nanofibers 310, 315 follows below. It is noted that at least some of nanofibers 310, 315 may preferably be electrically conductive.

Method 200 can also include depositing an active material on first nanofibers 310 to form coated nanofibers in step 220. The active material, as discussed further below, may be any material capable of providing an acceptable energy density and potential for a battery electrode, such as an electrochemically active nanoscale solid substance, as further discussed below. In one implementation, deposition of the active material may occur by separating first nanofibers 310 from second nanofibers 315, such that only first nanofibers 310 (or second nanofibers 315) may be subjected to the deposition of the active material to form coated nanofibers, while second nanofibers 315 may remain non-coated nanofibers. While the active material is deposited on first nanofibers 310 to coat nanofibers in step 220, other materials, such as nanoscale substances may also be deposited on first nanofibers 310. For example, other nanoscale substances may also be deposited, as further discussed below.

Figure 3B:
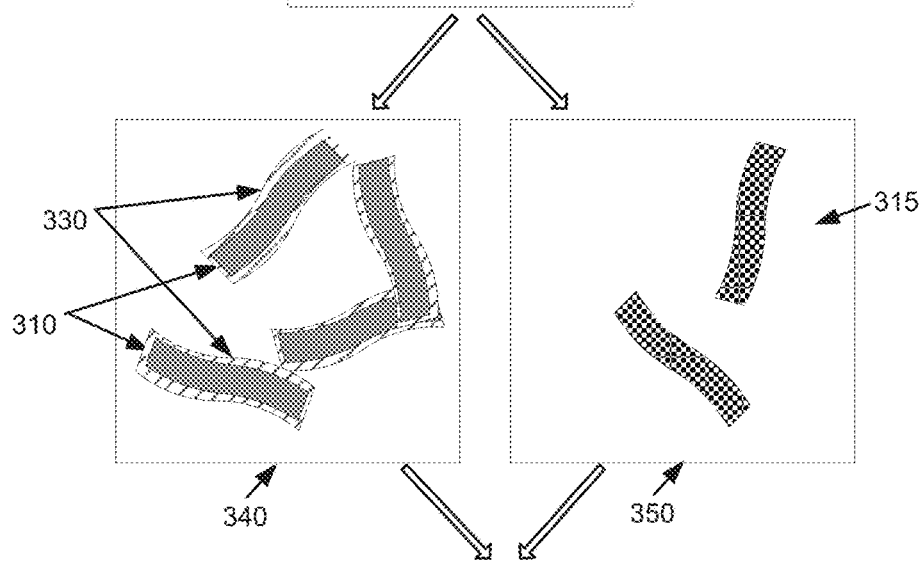

For example, as illustrated in FIG. 3B, first nanofibers 310 can be placed in second vessel 340, while second nanofibers 315 can be placed in third vessel 350. Active material 330 may be deposited on first nanofibers 310 in second vessel 340, while nanofibers 315 in third vessel 350 may remain free of active material 330. Deposition of active material 330 can be done by any method that allows active material 330 to adhere to a surface of nanofibers 310. For example, deposition can occur in a liquid phase by chemical or electrochemical deposition. As another example, deposition can occur in a gas phase by chemical vapor deposition or physical vapor deposition. In one implementation, the active material 330 may include an electrochemically active nanoscale solid substance, such as one or more of hydroxides, carbonates, fluorides, sulfates, oxalates, phosphates of one or more compounds, such as Ni, Zn, Cd, Fe, Pb, Mn, Co, Ag, Al, or Mg.

Method 200 can also include combining first nanofibers 310 coated with active material 330 (from step 210 or the like) and second nanofibers 315, which are not yet coated, in step 230. In one implementation, first nanofibers 310 with active material 330 coating and second nanofibers 315 may be combined by physically mixing them together in a liquid vehicle. For example, they can be mixed by any means, such as by using a mixer, an agitator, a sonicator, or an ultrasonicator. In another implementation, they can be mixed in a dry state by any means, such as a mixer, a blender, or a mill, where the mill can mix them by milling the active materials and the nanofibers together in any kind of high intensity device, including, but not limited to a ball mill or rod mill, colloid mill or microfluidizer in a continuous or a batch operation.

Figure 3C:
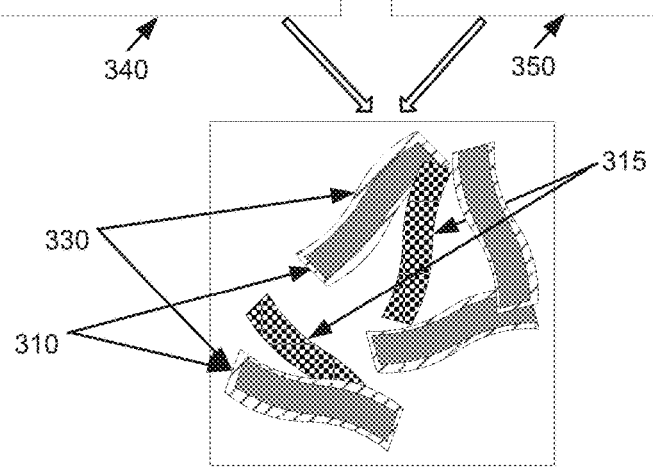

For example, as illustrated in FIG. 3C, nanofibers 310 with coating 330 from second vessel 340 may be combined with non-coated nanofibers 315 from third vessel 350.

Figure 3D:
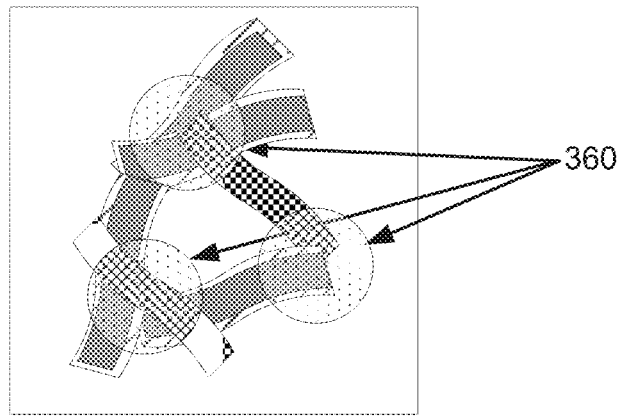

In one example, as illustrated in FIG. 3D, first nanofibers 310 with coating 330 and second nanofibers 315 can be networked together to form an electrically conductive network of nanofibers with electrical communication areas 360. By combining first nanofibers 310 with active material 330 and second nanofibers 315, electrical conductivity between first nanofibers 310 and second nanofibers 315 can be provided within electrical communication areas 360. While not wishing to be bound by theory, it is believed that the electrical contacts between nanofibers 315 will not be hindered by active material 330. Also, because of a plurality of these electrical contacts, the overall network can be very conductive.

Figure 5:
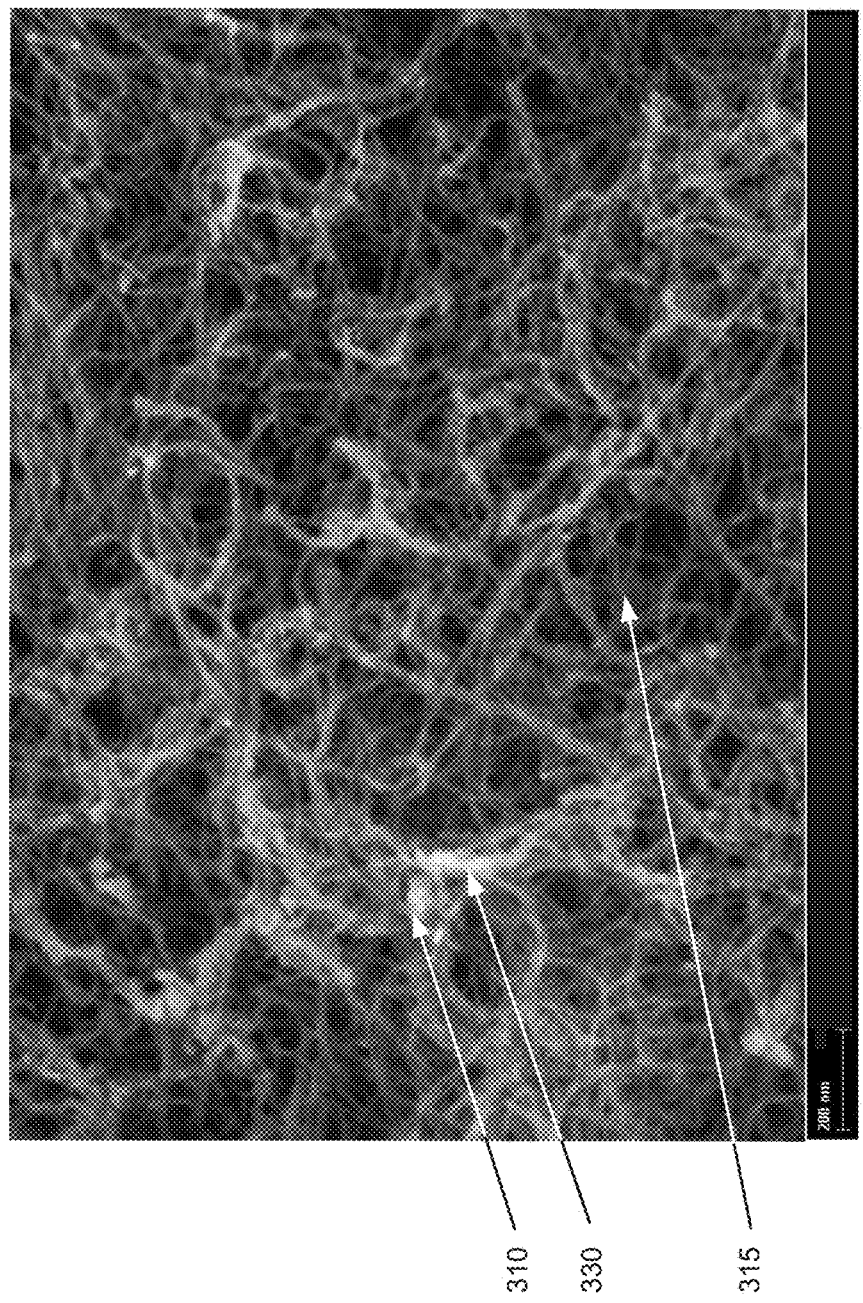
FIG. 5 is an SEM image of nanofibers including active material thereon prior to redistribution of the active material within the nanofibers.

For example, as illustrated in FIG. 5, which is an SEM image of nanofibers including active material thereon prior to redistribution of the active material within the nanofibers, a network of first nanofibers 310 with active material 330 (i.e., nanofibers 310 with active material 330 located on the surface) and second nanofibers 315 (i.e., nanofibers without active material 330) may be provided. As shown in FIG. 5, active material 330 may be present on first nanofibers 310 and not present on second nanofibers 315.

Method 200 can include redistributing active material 330 throughout the network in step 240. In one implementation, redistribution of active material 330 can be provided by recrystallizing active material 330 from active material 330 on the surface of second nanofibers 310 to the surface of first nanofibers 315. In another implementation, redistribution of active material 330 may be provided via electrical charge and discharge.

Figure 3E:
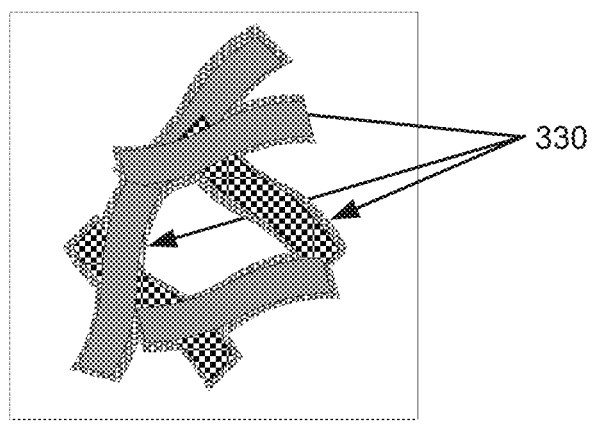

For example, as illustrated in FIG. 3E, active material 330 from coated nanofibers 310 can be redistributed onto a portion of the previously non-coated nanofibers 315 to redistribute active material 330. Advantageously, in one implementation, active material 330 from coated nanofibers 310 can provide coverage of the surface of coated nanofibers 310 and coverage of the surface of the previously non-coated nanofiber 315 such that electrolytes that may be brought into contact with coated nanofibers 310 and the previously non-coated nanofiber 315 would not contact either of the underlying nanofibers 310, 315.

By providing active material 330 directly on nanofibers 310, 315, electrical conduction paths between nanofibers 310, 315 and active material 330 can be reduced in length, thus leading to increased electrical conduction speed through a resulting electrode.

Figure 6:
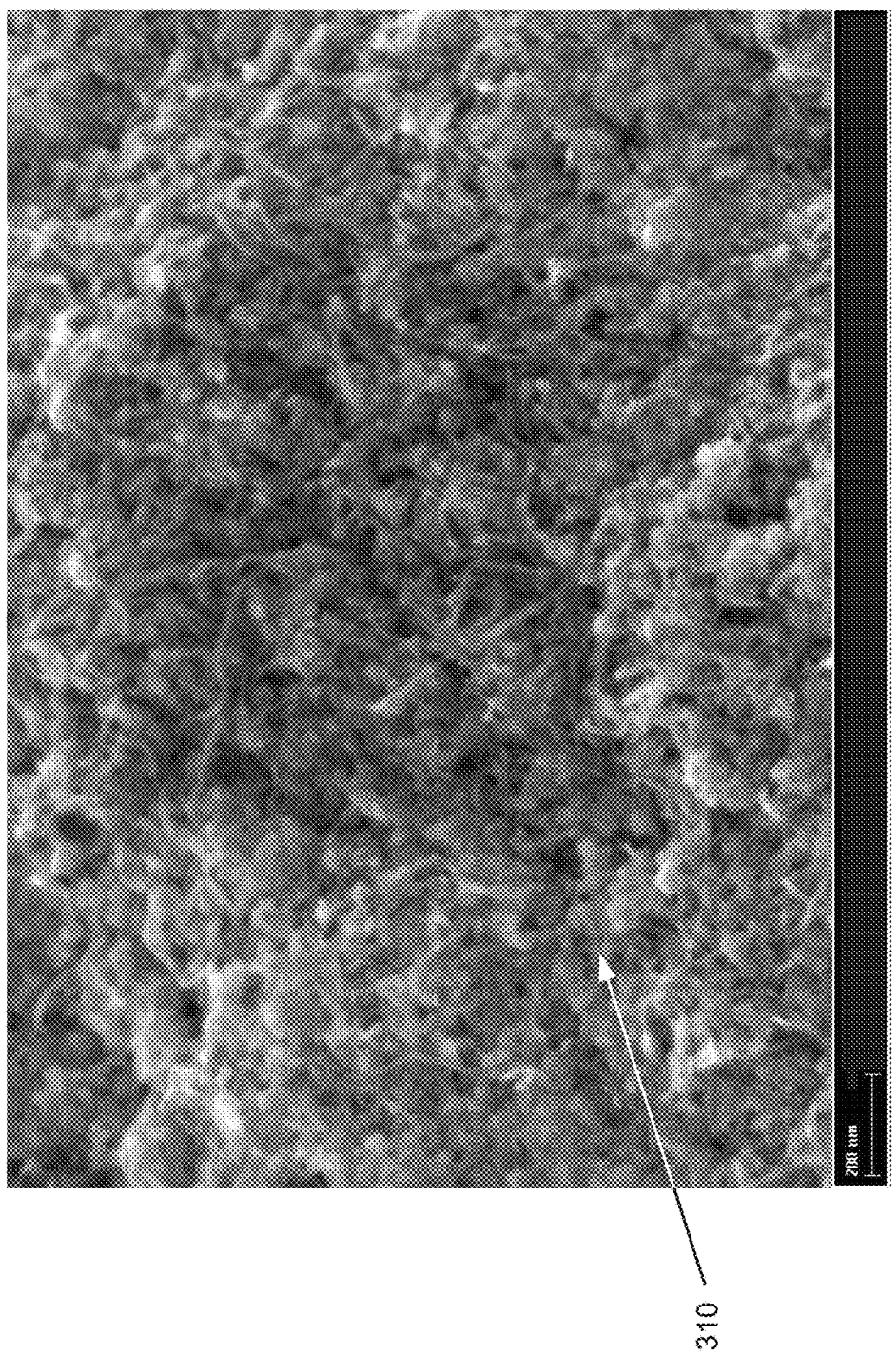
FIG. 6 is an SEM image of nanofibers including active material thereon after redistribution of the active material within the nanofibers.

In one implementation, as illustrated in FIG. 6, which is an SEM image of nanofibers including active material thereon after redistribution of the active material within the nanofibers, the coating from coated nanofibers 310 can move to cover large areas of nanofibers 310, 315 with deposits by distributing active material 330 from first coated nanofibers 310 and to previously non-coated second nanofibers 315.

Figure 7:
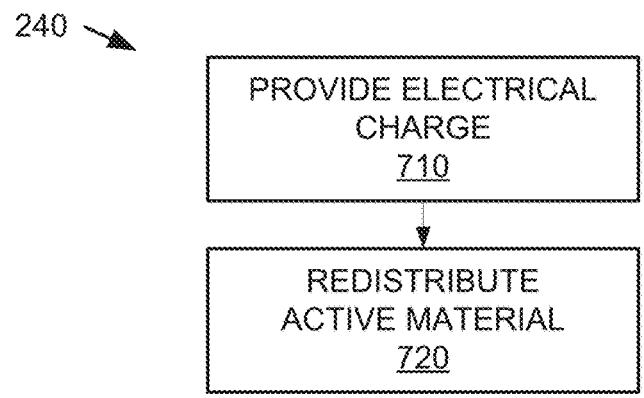
FIG. 7 is an example flowchart of a step of the example method of FIG. 2.
Figure 8A:
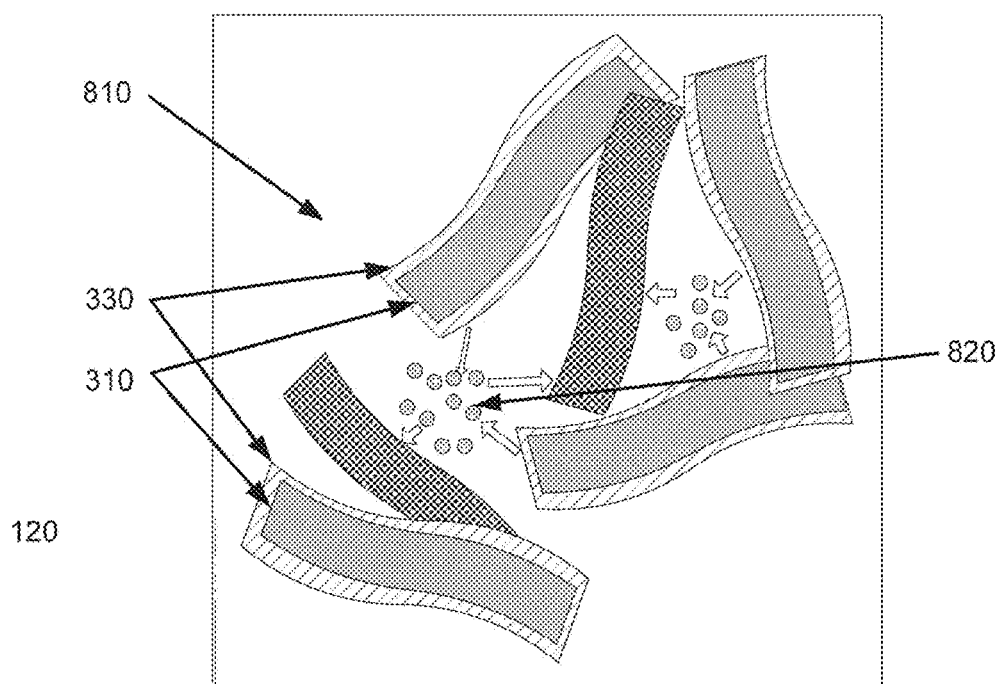
FIGS. 8A-8B are example illustrations of nanofibers and active material when the active material is redistributed among the nanofibers.

One implementation is illustrated in FIG. 7, which is an example flowchart of step 240 of method 200 of FIG. 2, and in FIG. 8A, which is an example illustration of nanofibers 310, 315 and active material 330 when active material 330 is redistributed among the nanofibers 310, 315. In FIGS. 7 and 8A, redistributing active material 330 can occur by providing an electrical charge to nanofiber network 810, which includes first (i.e., coated) nanofibers 310 and second (i.e., non-coated) nanofibers 315, in sub-step 710 of step 240. By providing an electrical charge, some of active material 330 can be released from first nanofibers 310 as released active material 820. Released active material 820 can be released into areas among coated first nanofibers 310 and non-coated second nanofibers 315.

Redistribution of released active material 820 from first nanofibers 310 to second nanofibers 315 can occur in sub-step 820. It is believed that released active material 820 will deposit onto the most electrochemically active areas of second nanofibers 315, which should be the non-coated surfaces of second nanofibers 315. It is also believed that while the non-coated areas of second nanofibers 315 are coated with released active material 820, the newly coated areas will become less electrochemically active and less attractive to released active material 820 compared to non-coated areas of second nanofibers 315. Eventually, the non-coated areas of second nanofibers 315 can become coated and the electrochemical activity of first nanofibers 310 and second nanofibers 315 should reach equilibrium from the redistribution of released active material 820.

Alternatively, other mechanisms can be used to release active material 330 from coated first nanofibers 310, as released active material 820 for deposition on second nanofibers 315. For example, the network of coated nanofibers 310 with active material 330 and uncoated nanofibers 315 can be subjected to repeated heating and cooling cycles in a liquid vehicle. Active material 330 can be partially released as released active material 820 during a heating cycle and re-deposited in different locations during the cooling cycle.

Figure 8B:
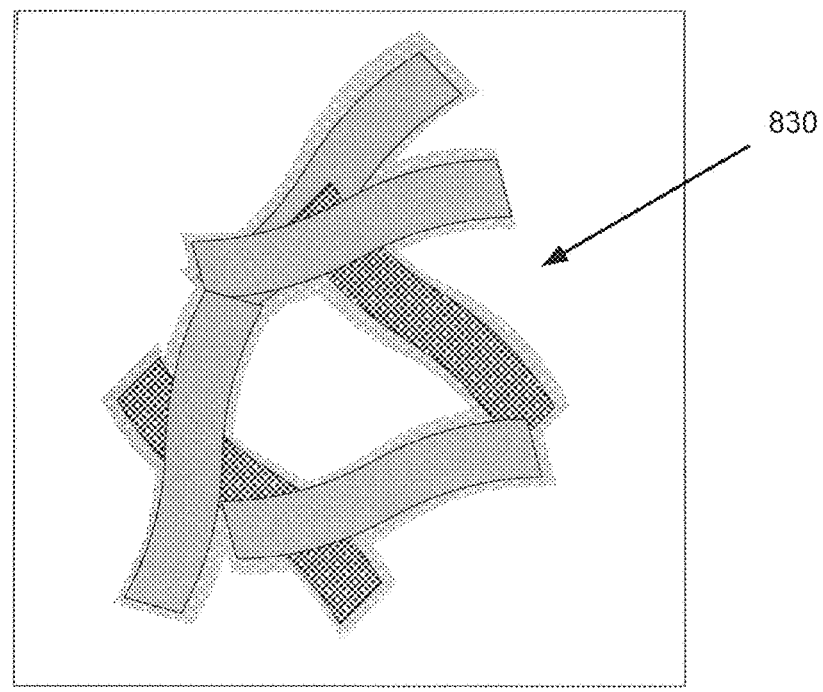

Next, as illustrated in FIG. 8B, which is an example illustration of nanofibers 310, 315 and active material 330 when active material 330 is redistributed among nanofibers 310, 315, nanofiber network 810, which can be an agglomeration or aggregation of first nanofibers 310 and second nanofibers 315, can be made accessible to released active material 820. A coated nanofiber network 830 may be formed by allowing released active material 820 to attach to non-coated second nanofibers 315 (and coated first nanofibers 310) to form coated nanofiber network 830 via redistribution. In one implementation, several redistributions of active material 330 via various redistribution mechanisms may occur to allow released active material 820 to coat previously non-coated second nanofibers 315. One example of a redistribution mechanism may be recrystallization.

By redistributing active material 330 to form coated nanofiber network 830, electrical communication between second nanofibers 315 can be established within coated nanofiber network 830. This can occur before second nanofibers 315 are coated to allow electrical communication between second nanofibers 315 to be preserved. By preserving the electrical communication, electrical conductivity between second nanofibers 315 can be uninterrupted by active material 330, yet active material 330 coverage throughout coated nanofiber network 830 can be optimized.

While not wishing to be bound by theory, it is believed that coating first nanofibers 310 and second nanofibers 315 prior to networking may cause active material 330 to insulate junctions between nanofibers 310, 315 and may prevent the nanofibers from having electrical communication with one another. As such, the network formation step is preferably before the coating or at least before the completion of the coating step (e.g., before redistribution is complete).

Figure 9:
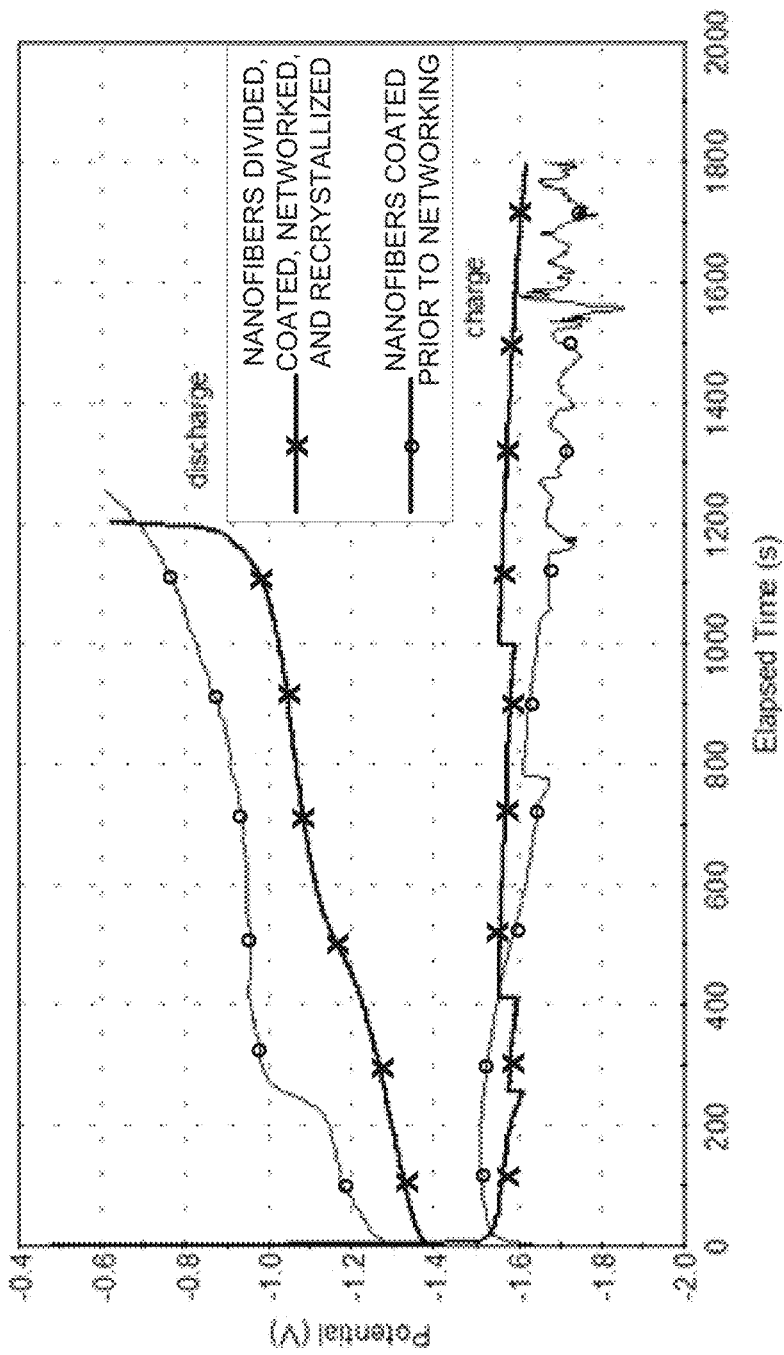
FIG. 9 is an example graphical illustration of charge-discharge results for a nanofiber-nanoscale active material electrode before and after redistribution of the active material.

FIG. 9 is an example graphical illustration of charge-discharge results for an example nanofiber-nanoscale active material electrode before and after redistribution of active material 330. As illustrated in FIG. 9, nanofibers which are divided, coated, networked, and redistributed show superior charge and discharge properties compared to nanofibers which are coated prior to networking. In FIG. 9, two similar samples, a first sample with nanofibers coated with $ZnCO_3$, a second sample with ⅔ of the nanofibers coated with $ZnCO_3$, mixed with ⅓ non-coated nanofibers. Both samples were charged and discharged at 2 C rate (the currents, at which the battery is expected to be charged and discharged in ½ hour). FIG. 9 shows a cycle in 30% $K_2CO_3$ saturated with ZnO electrolyte. One can see that the charge curve is noisy for the first sample, pointing to poor electrical contacts. The second sample, on the other hand, is smooth. This result, in addition to the higher potentials on the discharge curve of the second sample, appears to indicate that the second sample has better electrical contacts (lower internal resistance).

Method 200 can include forming an electrode from coated nanofiber network 830 in step 250. In one implementation, coated nanofiber network 830 can be wetted with an electrolyte. Next, wetted coated nanofiber network 830 can be made into a paste, and the paste can be formed into an electrode. For example, the paste may be pressed onto a current collector, such as a conductive film, current collector plate, etc. In another implementation, coated nanofiber network 830 can be its own current collector.

Figure 3F:
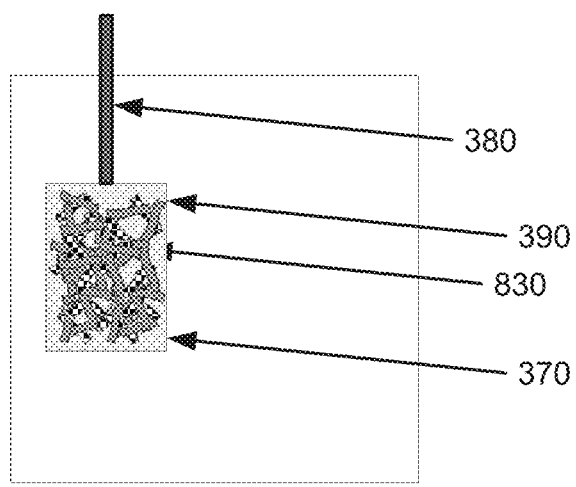
Figure 3G:
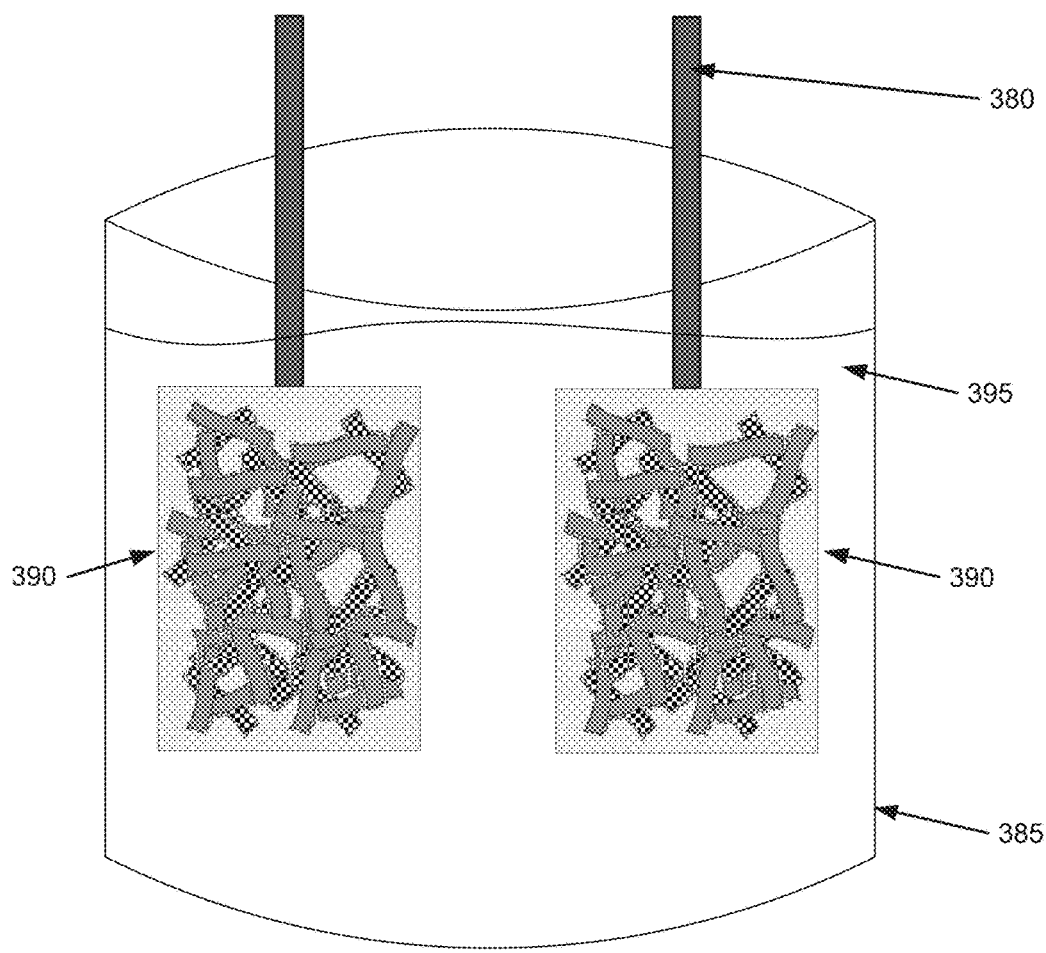
FIG. 3G is an example illustration for forming a battery using the electrode from the method of FIG. 2.

Additionally, as illustrated in FIG. 3F, a paste of coated nanofiber network 830 (or other coated nanofiber network) can be provided on a current collector plate 370 and a lead 380 can be attached to form an electrode 390. In one implementation, coated nanofiber network 830 may be wetted with the same or different electrolyte as the electrolyte used in networking first nanofibers 310 and second nanofibers 315 in step 240. Additionally, step 240 and step 250 may be done in any order, such as forming the electrode in step 250, then redistributing the active material in step 240; redistributing the active material in step 240, then forming the electrode in step 250; concurrently forming the electrode and redistributing the active material in steps 240 and 250; or may include additional intervening steps.

Method 200 can include repeating steps 210 to 250 to provide additional electrodes. In one implementation, steps 210 to 250 can be done to form an anode, then using a different active material, can be repeated to form a cathode.

FIG. 3G is an example illustration for forming a battery using the electrode from method 200 of FIG. 2. For example, as illustrated in FIG. 3G, two electrodes 390 with leads 380 can be placed in a vessel 385 with electrolyte 395 to form a battery.

C. Electrolyte Selection

One way of increasing the charging/discharging speed of batteries is to utilize a fast electrolyte. Aqueous electrolytes can be safe and fast, but can have limited usefulness as water decomposes at about one volt. Non-aqueous electrolytes can tolerate higher voltages, but are usually less conductive (i.e. slower) than aqueous electrolytes as well as having safety issues, such as flammability and explosiveness. In one embodiment, the electrolyte may include an aqueous, ionically conductive electrolyte.

An electrolyte can be selected based upon compatibility with the electrodes selected. Many battery chemistries, especially those with metal anodes, also suffer from slow dissolution of active materials into the electrolyte and/or slow self-discharge by undesirable side reactions. Although methods to mitigate these are known, the degree of the problem is basically proportional to the surface area of the active material. Inasmuch as nanofiber electrodes have much higher surface area than most battery electrodes, many known methods prove impracticable for nanofiber based electrodes. For example, the quantity of additive, mitigant, etc. can exceed the solubility or become otherwise impractical for use.

Aqueous electrolytes, as mentioned above, can suffer from undesirable side reactions causing gas evolution. Exposed surface of the conductive support network may catalyze hydrogen evolution or oxygen evolution from water at more or less the same voltages needed to cause the desired half-cell reactions. Thus, surfaces of the conductive support network may be desirably electrochemically insulated by covering with active material to reduce gas evolution and increase charge-discharge efficiency.

Depositing additional active material may not achieve coverage of the conductive support network to reduce or prevent gas evolution. In one embodiment herein, active material 330 may be provided such that active material 330 electrochemically isolates first nanofibers 310 and second nanofibers 315, preferably when networked as coated nanofiber network 830, from electrolytes. It is believed that depositing more active material 330 may not achieve complete coverage. Crystallization or deposition from solution would preferentially deposit active material 330 on active material 330 that is already there rather than improving coverage of the remaining bare surfaces of nanofibers 310, 315. The energy of crystal formation on the same material is usually lower than nucleation on a different material, thus the already deposited active material 330 can serve as a more preferable substrate for the further deposition of additional material 330.

D. Nanofiber Selection

As the active materials generally do not provide much, if any mechanical support, nanofibers in the form of a network of nanofibers can be provided for mechanical support of the active materials in an electrode. In addition to providing a support for the active materials, the network of nanofibers can also be used to conduct electricity (i.e., provide a pathway for electrons) from electrodes to an outside load. A network of nanofibers can be formed by aggregating nanofibers into a random interpenetrating network, which can provide a pathway for electrons to access active material supported by the random interpenetrating network. As mentioned above, at least some of the nanofibers are preferably electrically conductive.

Additionally, in order for the battery to be fast, both in charge and discharge, some of the active material can be provided in close proximity with a nanofiber (i.e., in contact). By providing a network of nanofibers to support the active materials, the distance between the active material and a nanofiber in the network of nanofibers can approach zero to allow electrons to flow between the active material and the nanofiber readily.

The terms "nanotube," "fibril," and "carbon nanotube" are used interchangeably to refer to single wall (i.e., only a single graphene layer parallel to the nanotube axis) or multi-wall (i.e., more than one graphene layer more or less parallel to the nanotube axis) carbon nanotubes or other nanoscale sized fibers. Each refers to an elongated structure having a cross-section (e.g., angular fibers having edges) or a diameter (e.g., rounded) of, for example for multi-wall nanotubes, less than 1 micron, less than 0.5 microns, less than 0.2 microns, less than 100 nm, less than 50 nm, less than 20 nm; or for example for single wall nanotubes, less than 5 nanometers. Other types of carbon nanotubes are also known, such as fishbone fibrils (e.g., wherein the graphene sheets are disposed in a herringbone pattern with respect to the nanotube axis), "buckytubes," etc. As produced, carbon nanotubes may be in the form of discrete nanotubes, aggregates of nanotubes (i.e., dense, microscopic particulate structure comprising entangled carbon nanotubes) or a mixture of both. Each of these conformations and structures may be used as "nanofibers" as discussed herein, as each would provide electrically conductive, networkable structures to support active materials.

The term "nanofiber" is broader, encompassing both nanotubes and other nanosized fibers that may not be hollow. The nanofiber may be oriented such that orientation(s) of graphenic sheet(s) may be at an angle to the axis (including perpendicular) of the nanofiber or may lack the defined orientation of the graphenic sheets or which may be covered with an outer layer of pyrolytic carbon. Many of these structures whose wall structure is not parallel to the fiber axis may have very small hollow cores or a hollow core that may not be discernible. It is not necessary that these nanofibers be of circular cross section although symmetrical cross sections are preferred. Nanofibers that have been graphitized in a separate step post synthesis may be used. The graphitization may be partial or complete as measured by the temperature employed. Further discussion on nanofibers can be found in U.S. Pat. No. 5,800,706 and/or U.S. Pat. No. 6,099,960, which are incorporated in their entireties by reference.

Nanofibers exist in a variety of forms and have been prepared through the catalytic decomposition of various carbon-containing gases at metal surfaces. These include those described in U.S. Pat. No. 6,099,965 to Tennent, et al. and U.S. Pat. No. 5,569,635 to Moy, et al., both of which are hereby incorporated by reference in their entireties.

In an embodiment, nanofibers are made by catalytic growth from hydrocarbons or other gaseous carbon compounds, such as CO, mediated by supported or free floating catalyst particles. Preferably, catalysts used for catalytic growth are supported on inert supports such as silica, alumina or magnesia. Preferably, supported or free floating catalyst particles are not removed prior to forming the nanofiber network. In some cases, however, it may be desirable to remove the catalyst particles and this may be done by chemical treatment with acids or bases or thermally (e.g., microwave treatment).

Nanofibers may also be formed as aggregates of carbon nanotubes, which may be dense microscope particulate structures of entangled carbon nanotubes and may resemble the morphology of bird nest ("BN"), cotton candy ("CC"), combed yarn ("CY") or open net ("ON"). Nanofibers may also be grown on a flat support, attached by one end to the support and parallel to each other, forming a "forest" structure. Aggregates are formed during the production of carbon nanotubes and the morphology of the aggregate is influenced by the choice of catalyst support. Porous supports with completely random internal texture, e.g., fumed silica or fumed alumina, grow nanotubes in all directions leading to the formation of bird nest aggregates. Combed yarn and open net aggregates are prepared using supports (e.g., alumina or magnesia) having one or more readily cleavable planar surfaces, e.g., an iron or iron-containing metal catalyst particle deposited on a support material having one or more readily cleavable surfaces and a surface area of at least 1 square meter per gram.

Individual carbon nanotubes in aggregates may be oriented in a particular direction (e.g., as in "CC," "CY," and "ON" aggregates) or may be non-oriented (i.e., randomly oriented in different directions, for example, as in "BN" aggregates). Carbon nanotube "agglomerates" are composed of carbon nanotube "aggregates." Carbon nanotube "aggregates" retain their structure in the carbon nanotube "agglomerates." As such, "BN" agglomerates, for example, may contain "BN" aggregates.

"BN" structures may be prepared as disclosed in U.S. Pat. No. 5,456,897, for example, which is hereby incorporated by reference in its entirety. "BN" agglomerates are tightly packed with typical densities of greater than 0.1 g/cc, for example, 0.12 g/cc. Transmission electron microscopy ("TEM") reveals no true orientation for carbon nanotubes formed as "BN" agglomerates. Patents describing processes and catalysts used to produce "BN" agglomerates include U.S. Pat. Nos. 5,707,916 and 5,500,200, both of which are hereby incorporated by reference in their entireties.

On the other hand, "CC," "ON," and "CY" agglomerates have lower density, typically less than 0.1 g/cc, for example, 0.08 g/cc and their TEMs reveal a preferred orientation of the nanotubes. U.S. Pat. No. 5,456,897, hereby incorporated by reference in its entirety, describes the production of these oriented agglomerates from catalyst supported on planar supports (i.e. those having one or more readily cleavable planar surfaces of alumina or magnesia, for example).

"CY" may also refer generically to aggregates in which the individual carbon nanotubes are oriented, with "CC" aggregates being a more specific, low density form of "CY" aggregates.

Carbon nanotubes are distinguishable from commercially available continuous carbon fibers. For instance, the diameter of continuous carbon fibers, which is always greater than 1.0 micron and typically 5 to 7 microns, is also far larger than that of carbon nanotubes, which is usually less than 1.0 micron. Carbon nanotubes also have vastly superior strength and conductivity than carbon fibers.

Carbon nanotubes also differ physically and chemically from other forms of carbon such as standard graphite and carbon black. Standard graphite is, by definition, flat. Carbon black is an amorphous structure of irregular shape, generally characterized by the presence of both sp2 and sp3 bonding. On the other hand, carbon nanotubes have one or more layers of ordered graphitic carbon atoms disposed substantially concentrically about the cylindrical axis of the nanotube. These differences, among others, make graphite and carbon black poor predictors of carbon nanotube chemistry.

"Multi-wall nanotubes" as used herein refers to carbon nanotubes which are substantially cylindrical, graphitic nanotubes of substantially constant diameter and comprise cylindrical graphitic sheets or layers whose c-axes are substantially perpendicular to the cylindrical axis, such as those described, e.g., in U.S. Pat. No. 5,171,560 to Tennent, et al. The term "multi-wall nanotubes" is meant to be interchangeable with all variations of said term, including but not limited to "multi-wall nanotubes," "multi-walled nanotubes," "multiwall nanotubes," etc.

"Single wall nanotubes" as used herein refers to carbon nanotubes which are substantially cylindrical, graphitic nanotubes of substantially constant diameter and comprise a single cylindrical graphitic sheet or layer whose c-axis is substantially perpendicular to the cylindrical axis, such as those described, e.g., in U.S. Pat. No. 6,221,330 to Moy, et al. The term "single wall nanotubes" is meant to be interchangeable with all variations of said term, including but not limited to "single-wall nanotubes," "single-walled nanotubes," "single wall nanotubes," etc.

Multi-wall nanotubes as used herein subsumes the term "few-walled nanotubes." Such tubes having only two or three walls occupy a niche between single wall and multi-wall nanotubes, but may nevertheless be useful in the practice described herein.

It is understood that multi-wall carbon nanotubes may be readily functionalized. Methods of functionalizing nanotubes are discussed in U.S. Pat. No. 6,203,814, U.S. Pat. No. 7,413,723, and U.S. Pat. No. 6,872,681, which are incorporated by reference in their entireties. Such functionalized multi-wall carbon nanotubes may be more readily dispersed in aqueous media than as-made, non-functionalized multi-wall carbon nanotubes. Either functionalized or as-made nanotubes may be used herein.

Oxidation may be a first step in functionalization and may be done with either liquid phase or gas phase reagents. An initial oxidation may be followed by additional chemical reactions to convert the initial oxidation created functionalities to other chemical moieties. The functionalization may yield either a uniform chemical functionality or a mixture of chemical functionalities.

Adsorption may be another potential first step in functionalization. Compounds having aromatic or polyaromatic functionality may adsorb strongly onto carbon nanotubes. Porphyrins and aromatic acids are examples of such molecules.

Generally, functionally modified nanotubes may aggravate side reactions of an aqueous electrolyte with the functionally modified nanotubes. However, the functional groups on the surface may be beneficial for better adherence of active material 330 to a nanofiber. In one implementation, the step of redistributing active material on coated nanofiber network 830 may be helped by functional groups. After the redistribution, the nanofibers will no longer be in direct contact with electrolyte (as the nanofibers will be coated); therefore side reactions may be minimized. The conductivity of nanofiber networks depends not only on the inherent conductivity of the nanofibers, but also upon the average length and spatial density of the fibers in the network. Network resistance is believed to derive mainly from the fiber-fiber resistance at the intersections.

E. Active Material Selection

The terms "active material" and "electroactive agent" are used interchangeably to refer to chemical compounds that provide chemical energy for conversion to electrical energy in a battery. The active material may be an electrochemically active material in that it may be a substance that can participate in the release or acceptance of an electron. The active material may also be provided on a nanoscale level. In one embodiment, the active material may be electrochemically active nanoscale solid substances, such as nanoscale sized particles of electrochemically active material.

The choice of active material for a battery depends on factors other than energy density and power density. These include, but are not limited to: cost, safety, life, reliability, temperature stability, failure mode, etc. In embodiments provided herein, electrodes are provided that can improve the power density of any battery system or individual electrode. Electrode chemistries known to be reversible are, however, preferred. These include, but are not limited to $NiOOH/Ni(OH)_2$; $Zn/ZnOH$; $Cd/Cd(OH)_2$; $Fe/Fe(OH)_2$; $Pb/Pb(OH)_2$; $Pb/PbSO_4$; $MnO_2/Mn_2O_3$; $PbO_2/PbSO_4$; $Co/Co(OH)_2$; $Ag/AgO$; $Al/Al_2O_3$; $Mg/Mg(OH)_2$, Metal/Metal Hydride; etc.

In one embodiment, the active material may be provided by depositing the active material in nanoscale sized form from solution. In one embodiment, the active material may be nanoscale solid material after deposition on a nanofiber.

Additionally, the active material, upon application, may provide insulation from an electrolyte in an electrode, as described herein. In one embodiment, the active material may reduce or prevent interaction between the nanofibers and electrolyte in an electrode. For example, by utilizing the methods provided herein, side reactions between the nanofibers and the electrolyte may be reduced by the presence of the active material insulating the nanofibers from the electrolyte.

Systems compatible with an aqueous electrolyte are also preferred because aqueous electrolytes can better exploit the energy density of the batteries described herein.

F. Electrode Formation

In embodiments herein, electrodes can be made or provided in the form of a two dimensional sheet or mat. If a two dimensional sheet is provided, then the sheet may be assembled into a device with a current collector. For example, a current collector can be provided in the form of a foil or conductive layer aligned in parallel to the electrode and in intimate contact therewith. The through sheet conductivity of the electrode must be high enough not to limit the power density of the battery.

The electrode may also include non-conductive structural components, such as non-conductive nanofibers. The concentration of such structural components is not critical so long as the electrode conductivity is not compromised.

If a three dimensional mat is provided, then the mat may have a thickness as desired. While the performance of the electrode may vary with the thickness of the active material, such variations may also occur based upon different active materials.

In one embodiment, a coated nanotube network electrode can function as its own current collector. In this case, the coated nanotube network electrode can be connected to an outside load (or to other cells in the stack) through its edges, which causes the conductivity in the direction of the electrode plane (the x-y conductivity) to become critical to the cell resistance. This cell resistance may be less 200 ohms-cm, more preferably less than 100 ohms-cm, and still more preferably less than 50 ohms-cm.

G. Embodiments

In one embodiment, a nanofiber-$MnO_2$ electrode can be paired with a nanofiber-Zn electrode to provide a pair of fast fibril (nanofiber) electrodes in a battery. In other embodiments, electrodes with nanofibers and compounds of Zn, Co, Cd, Fe, and/or Pb can be paired with electrodes with nanofibers and compounds of Ni to provide fast fibril electrodes.

In one embodiment, a nanofiber electrode may contain more active material than nanofibers to allow for more active material to be present in an electrode. For example, a nanofiber electrode may contain less than 50 wt. % nanofibers. In another example, a nanofiber electrode may contain less than 25 wt. % nanofibers, which may also include more than 75 wt. % active material.

In one embodiment, a nanofiber electrode can have a porosity level that allows enough electrolyte to complete charge and discharge without precipitation. For example, a nanofiber electrode may contain a network with a volume of porosity of 50 to 90 vol. %, which can allow for sufficient levels of electrolyte to complete charge and discharge without precipitation. As another example, a nanofiber electrode may contain a network with a volume porosity of 50 to 80 vol. % to increase the electrode volume devoted to active ingredients, as porosity reduces electrode volume that could be devoted to active material.

It should be recognized that embodiments herein are describing the electrochemical aspects of the preferred electrodes. Other components may be added to the paste or mat for the electrodes to alter physical or electrical properties. Binders, additives to improve conductivity, cycle life, thermal stability, charge retention, shelf life, structural integrity, or other parameters may be employed. Generally, the quantity of additives should be small enough not to materially alter the energy or power density of the electrodes. For example, additives may preferably be added at less than 20 wt. % of the electrode, more preferably less than 10 wt. % of the electrode, and even more preferably less than 5 wt. % of the electrode. Examples of additives can be found in U.S. Pat. No. 6,790,559 (e.g., additives to Ni electrode: fluoride salts 0.1-1% for active material utilization) and U.S. Pat. No. 6,811,926 (e.g., additives to Zn electrodes: inorganic fibers (alumina and silica, 2-15%) and bismuth oxide (2-10%) for cycle life), both of which are incorporated by reference in their entireties.

H. Example—Method of Making an Electrode

Initially, active material 330 can be introduced into a network forming step by a prior "rough" deposition onto only a fraction of the nanofibers, in an aqueous electrolyte whose anion forms only a sparingly soluble salt, $NiCO_3$ or $ZnCO_3$, for example, with a cation of active material 330. A sparingly soluble salt may be any salt with solubility less than 1 g/100 g, but greater than zero. In one embodiment, the sparingly soluble salt may have solubility greater than zero and less than 0.1 g/100 g. For example, the sparing soluble salt may include, but is not limited to hydroxides, carbonates, fluorides, sulfates, oxalates, phosphates.

The sparingly soluble salt may be provided as an intermediate to assist in any redistribution of coating. If the sparingly soluble salt has been prior deposited onto a fraction of the nanofibers, then the network forming step can include both "roughly coated" and "plain" (non-coated/un-deposited) nanofibers.

Using method 200 described above, first nanofibers 310, preferably non-oxidized nanofibers, can be provided in a liquid vehicle that may include a readily soluble salt, such as $Ni(NO_3)_2$ or $ZnSO_4$, for example. Non-oxidized or oxidized fibers may be used. Further discussion of non-oxidized and oxidized fibers can be found in U.S. Pat. No. 7,413,723, which is incorporated in its entirety by reference.

A readily soluble salt as used herein may be any soluble compound that can form a sparingly soluble compound of the desirable chemistry. Chlorides, nitrates, bicarbonates, some sulfates, and other soluble salts may be used for the step of deposition of active material 220 of method 200. Next, a reactant, such as $K_2CO_3$ or KOH, can be added to the liquid vehicle, which includes a soluble salt, and the reactant can combine with the soluble salt to deposit the corresponding sparingly soluble salt on coated nanofibers 310. This sparingly soluble salt can become active material 330 after step 240 in method 200, discussed above.

Next, a repeated charge and discharge may be applied to a network of coated nanofibers 310 and non-coated nanofibers 315 in an appropriate electrolyte to redistribute active material 330 over all the nanofibers 310, 315 to form a coated nanofiber network 830.

Electrodes described herein may be used in batteries. The electrodes can be provided in single-use, non-rechargeable batteries (often referred to as "primary batteries") or multiple use, rechargeable batteries (often referred to as "secondary batteries"). The electrodes can also be provided in flexible batteries, or other types of batteries.

While the invention has been described in detail with reference to preferred embodiments thereof, it will be apparent to those skilled in the art that variations and modifications can be made, and equivalents employed without departing from the scope of the appended claims.

What is claimed is:

1. A method of manufacturing a coated network, comprising:
    method A, which comprises:
        (a) providing nanofibers, capable of forming a network in the presence of a liquid vehicle;
        (b) providing a nanoscale substance in the presence of the liquid vehicle;

(c) forming a network of the nanofibers and the nanoscale substance; and (d) redistributing at least a portion of the nanoscale substance within the network, thereby producing a network of nanofibers coated with the nanoscale substance, wherein the redistributing of the at least a portion of the nanoscale substance within the network comprises:
(1) providing a solvent in which the nanoscale substance has a solubility of less than 1 g/100 g, but greater than zero; and
(2) redistributing the nanoscale substance within the network using the solvent;
or
(1) providing a solvent; and
(2) subjecting the network to electrical charge and discharge in the solvent to dissolve at least a portion of the nanoscale substance in the solvent;

or method B, which comprises:
(a) providing nanofibers;
(b) coating between 10 and 90 wt. % of the nanofibers with a nanoscale substance resulting in a combination of coated nanofibers and non-coated nanofibers;
(c) forming a network of nanofibers with a combination of coated nanofibers and the non-coated nanofibers; and
(d) redistributing of at least a portion of the nanoscale substance within the network, thereby producing a network of nanofibers coated with the nanoscale substance, wherein the redistributing of the at least a portion of the nanoscale substance within the network comprises:
(1) providing a solvent in which the nanoscale substance has a solubility of less than 1 g/100 g, but greater than zero; and
(2) redistributing the nanoscale substance within the network;
or
(1) providing a solvent; and
(2) subjecting the network to electrical charge and discharge in the solvent to dissolve at least a portion of the nanoscale substance in the solvent.

2. The method of claim 1, wherein the providing nanofibers comprises providing a plurality of carbon nanotubes.

3. The method of claim 1, wherein if method A is selected, then the providing the nanoscale substance comprises providing an electrochemically active nanoscale substance, or if method B is selected, then the coating between 10 and 90 wt. % of the nanofibers with a nanoscale substance comprises coating between 10 and 90 wt. % of the nanofibers with an electrochemically active nanoscale substance.

4. The method of claim 1, wherein if method A is selected, then the providing the nanoscale substance comprises depositing the nanoscale substance from a solution, or if method B is selected, then the coating between 10 and 90 wt. % of the nanofibers with a nanoscale substance comprises coating between 10 and 90 wt. % of the nanofibers with an electrochemically active nanoscale substance.

5. The method of claim 1, wherein if method A is selected, then the forming the network of nanofibers and the nanoscale substance, or wherein if method B is selected, then the forming the network of nanofibers with a combination of coated nanofibers and the the non-coated nanofibers comprises:

forming a conductive network of carbon nanotubes by:
providing a dispersion of carbon nanotubes in a liquid vehicle; and
removing the liquid vehicle to form the conductive network of carbon nanotubes.

6. The method of claim 1, wherein the forming the network of nanofibers comprises:
forming a conductive network of one or more of the nanofibers in electrical contact with one or more of the other nanofibers.

7. The method of claim 1, further comprising providing secondary fibers comprising nanotubes, microfibers, or macrofibers.

8. The method of claim 7, wherein the providing the nanofibers comprises providing nanofibers that are different in composition or diameter from the secondary fibers.

9. A method of forming a coated network, comprising:
providing nanofibers;
separating between 10 and 90 wt. % of the nanofibers from the remainder of the nanofibers to form a first and a second group of nanofibers, respectively;
coating the first group of nanofibers with a first substance;
combining the coated first group of nanofibers with the second group of nanofibers to form a network;
redistributing the first substance in the network.

10. The method of claim 9, wherein the redistributing step comprises recrystallizing the first substance to form a second substance in the network, and wherein the first substance and the second substance are not the same chemical compounds.

11. The method of claim 10, wherein the recrystallizing the first substance to form a second substance comprises:
recrystallizing the first substance to form a second substance with a common cation.

12. The method of claim 10, wherein the recrystallizing the first substance to form a second substance comprises:
recrystallizing a salt of a predetermined cation to form a deposited substance of the predetermined cation.

13. A nanoscale coated network, comprising:
one or more first multi-wall carbon nanotubes electrically connected to one or more second multi-wall carbon nanotubes to form a porous nanofiber network, wherein at least one of the one or more second multi-wall carbon nanotubes is in electrical contact with another of the one or more second multi-wall carbon nanotubes; and
an active material coating, wherein the active material coating and the porous nanofiber network form a porous nanoscale coated network, and wherein the active material coating is redistributed within the porous nanofiber network to form the porous nanoscale coated network using recrystallization, or electrical charge and discharge, and:
covers at least a portion of the one or more first multi-wall carbon nanotubes and does not cover the one or more second multi-wall carbon nanotubes to form the porous nanoscale coated networker and the active material coating is redistributed from the at least a portion of the one or more first multi-wall carbon nanotubes to at least a portion of the one or more second multi-wall carbon nanotubes to cover and electrochemically isolate the porous nanoscale coated network from materials outside the porous nanoscale coated network; or
covers at least a portion of the one or more first multi-wall carbon nanotubes and at least a portion of the one or more second multi-wall carbon nanotubes to form the porous nanoscale coated network, wherein the active material coating surrounds, but does not electrically disrupt the electrical contact between the one or more second multi-wall carbon nanotubes and the another of the one or more second multi-wall carbon nanotubes; or provides electrochemical insulation on an outer portion of at least a portion of the one or more first multi-wall carbon nanofibers and at least a portion of the one or more second multi-wall carbon nanofibers, wherein the active material coating comprises at least 50% by weight of the electrically conductive, electrochemically insulated porous nanoscale coated network; or covers at least a portion of the porous nanofiber network to form the porous nanoscale coated network, wherein the active material coating surrounds, but does not interfere with the electrical contact between the one or more second multi-wall carbon nanotubes and the another of the one or more second multi-wall carbon nanotubes.

14. The nanoscale coated network of claim 13, wherein the active material coating:

does not interfere with the electrical connection between the one or more first multi-wall carbon nanotubes and the one or more second multi-wall carbon nanotubes; or comprises at least 70% by weight of the nanoscale coated network; or comprises an electroactive agent; or comprises a compound of Ni, Zn, Cd, Fe, Pb, Mn, Co, Ag, Al, or Mg; or comprises a compound of Ni or Zn.

15. The nanoscale coated network of claim 13, wherein the one or more first multi-wall carbon nanotubes and the one or more second multi-wall carbon nanotubes:

form a random interpenetrating network of multi-wall carbon nanotubes; or comprise at most 50% by weight of the porous nanoscale coated network, and the active material coating comprises at least 50% by weight of the porous nanoscale coated network.

16. The nanoscale coated network of claim 15, wherein the porous nanoscale coated network has a volume of porosity of 50 to 90 vol. %.

* * * * *